United States Patent
Fries et al.

(10) Patent No.: US 7,457,400 B1
(45) Date of Patent: Nov. 25, 2008

(54) COMPUTERIZED SYSTEM AND METHOD FOR DISPLAYING LINE USAGE REPORTS

(75) Inventors: Jeffrey M. Fries, Wake Forest, NC (US); Lyndon Casey, Grand Island, FL (US)

(73) Assignee: Embarq Holdings Company, LLC, Overland Park, KS (US)

( * ) Notice: Subject to any disclaimer, the term of this patent is extended or adjusted under 35 U.S.C. 154(b) by 0 days.

(21) Appl. No.: 10/787,978

(22) Filed: Feb. 26, 2004

(51) Int. Cl.
  *H04M 15/00* (2006.01)
(52) U.S. Cl. .................... 379/112.08; 379/112.01; 379/112.06; 379/133
(58) Field of Classification Search .......... 379/32.01, 379/32.02, 32.04, 112.01, 112.03, 112.06, 379/112.07, 112.08, 133, 134, 136, 138
See application file for complete search history.

(56) References Cited

U.S. PATENT DOCUMENTS

| | | | |
|---|---|---|---|
| 5,825,769 A * | 10/1998 | O'Reilly et al. | 370/360 |
| 5,875,242 A | 2/1999 | Glaser et al. | |
| 5,937,042 A | 8/1999 | Sofman | |
| 6,359,976 B1 * | 3/2002 | Kalyanpur et al. | 379/134 |
| 6,385,301 B1 * | 5/2002 | Nolting et al. | 379/112.01 |
| 6,385,668 B1 | 5/2002 | Gaddess et al. | |
| 6,411,681 B1 * | 6/2002 | Nolting et al. | 379/112.01 |
| 6,449,350 B1 * | 9/2002 | Cox | 379/134 |
| 6,721,405 B1 * | 4/2004 | Nolting et al. | 379/133 |
| 6,728,352 B1 * | 4/2004 | Phillips et al. | 379/112.01 |
| 6,744,780 B1 | 6/2004 | Gu et al. | |
| 6,744,866 B1 | 6/2004 | Nolting et al. | |
| 6,795,707 B2 | 9/2004 | Martin et al. | |
| 2001/0028706 A1 | 10/2001 | Nolting | |
| 2004/0031059 A1 | 2/2004 | Bialk et al. | |
| 2005/0125482 A1 | 6/2005 | Lyles et al. | |
| 2005/0185778 A1 * | 8/2005 | Danzl et al. | 379/112.01 |

* cited by examiner

*Primary Examiner*—Quoc D Tran
(74) *Attorney, Agent, or Firm*—Sonnenschein, Nath & Rosenthal LLP

(57) ABSTRACT

The present invention relates to a user interface for communicating line usage information. The user interface includes means for requesting type of report of line usage information and means for requesting report criteria. The user interface further includes means for displaying a line usage report based on the report criteria and requested type of report. The present invention also relates to a method for communicating line usage information to a user is described. The method: prompts a user to enter a type of report of line usage information and to enter report criteria. The method then displays a corresponding line usage report.

23 Claims, 16 Drawing Sheets

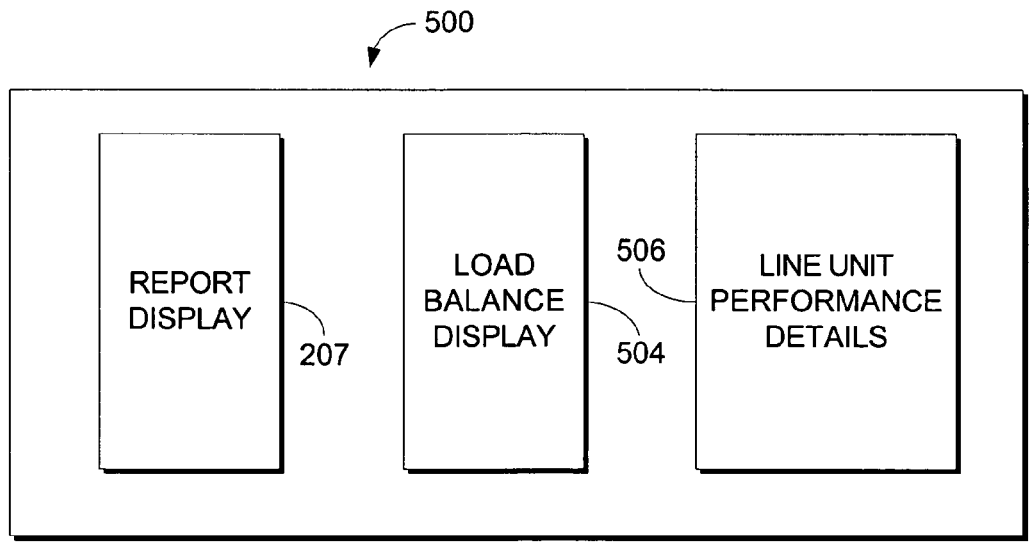
FIG. 5
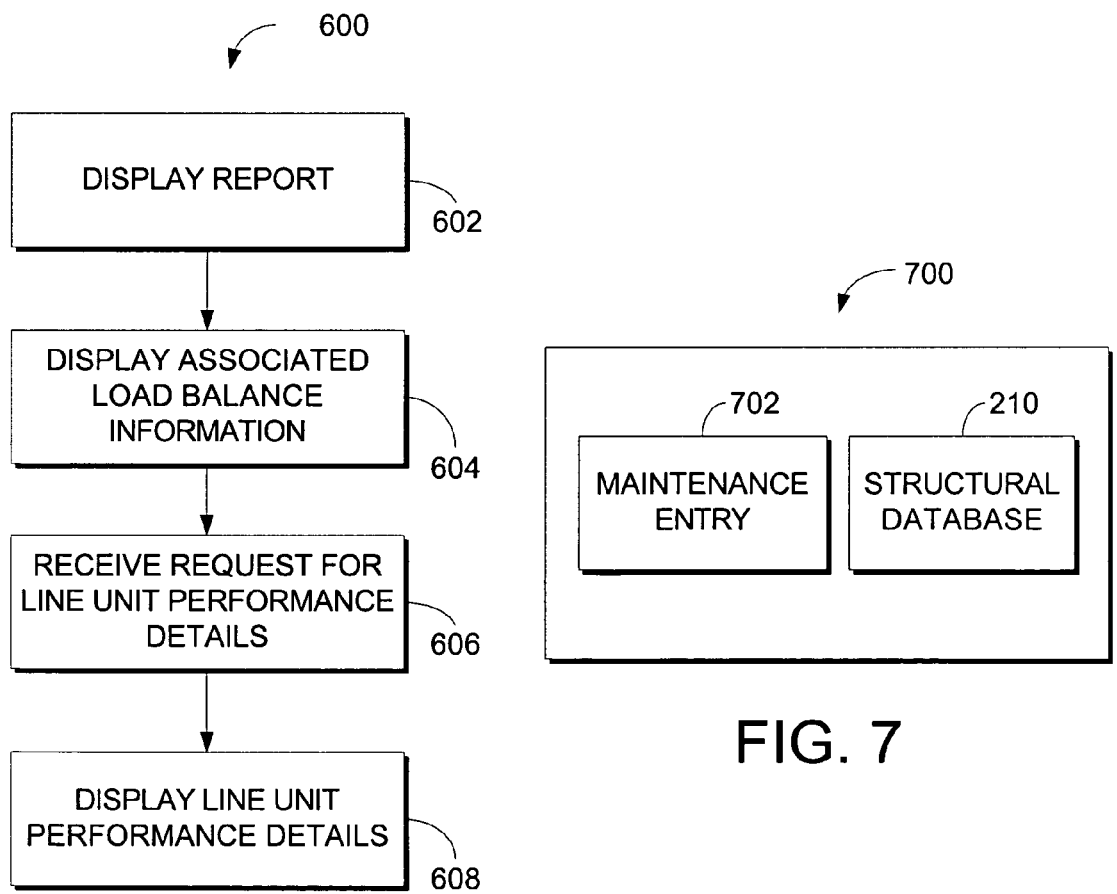
FIG. 6
FIG. 7

Consecutive Week Blockage Report
Line Unit with 3 Consecutive Weeks of Blockage

| Region | Switch | Host | Host Description | Switch Module | Line Unit |
|---|---|---|---|---|---|
| Mid-Atlantic | BATH | GNVLNCXA75F | 5th St. (Martin Luther King) | 35 | 1 |
| Mid-Atlantic | BUIES CREEK | DUNNNCXA09A | DUNN CO | 14 | 1 |
| Mid-Atlantic | MAXTON | FYVLNCXA32F | McGilvary | 55 | 3 |
| Mid-Atlantic | RED SPRINGS | FYVLNCXA32F | McGilvary | 25 | 2 |
| Mid-Atlantic | RED SPRINGS | FYVLNCXA32F | McGilvary | 25 | 5 |
| Mid-Atlantic | WMTNNCXA79F | WMTNNCXAD50 | Williamston | 3 | 0 |
| North Central | Brook | MNTRINXADS0 | Monticello | 6 | 1 |
| North Central | Lawrenceburg | LRBGINXADS0 | Lawrenceburg | 4 | 2 |
| North Central | Medaryville | MNTRINXADS0 | Monticello | 14 | 1 |
| North Central | Portland | DCTRINXADS0 | Decatur | 8 | 0 |
| North Central | Portland | DCTRINXADS0 | Decatur | 8 | 1 |
| North Central | Portland | DCTRINXADS0 | Decatur | 8 | 2 |
| North Central | Portland | DCTRINXADS0 | Decatur | 8 | 3 |
| North Central | Portland | DCTRINXADS0 | Decatur | 8 | 4 |
| North Central | Portland | DCTRINXADS0 | Decatur | 8 | 5 |
| North Central | Portland | DCTRINXADS0 | Decatur | 9 | 1 |
| North Central | Portland | DCTRINXADS0 | Decatur | 9 | 2 |
| North Central | Preble/Tocsin | DCTRINXADS0 | Decatur | 19 | 1 |
| North Central | Union City | DCTRINXADS0 | Decatur | 13 | 3 |
| Southern | AQUALINDA | CPCRFLXADS0 | CAPE CORAL | 14 | 4 |
| Southern | AQUALINDA | CPCRFLXADS0 | CAPE CORAL | 14 | 5 |
| Southern | AQUALINDA | CPCRFLXADS0 | CAPE CORAL | 21 | 1 |
| Southern | BUENAVENTURE LAKES | KSSMFLXADS0 | KSSIMMEE | 41 | 4 |
| Southern | BUENAVENTURE LAKES | KSSMFLXADS0 | KSSIMMEE | 41 | 7 |
| Southern | BUENAVENTURE LAKES | KSSMFLXADS0 | KSSIMMEE | 41 | 12 |
| Southern | CAPE CORAL | CPCRFLXADS0 | CAPE CORAL | 1 | 0 |
| Southern | CAPE CORAL | CPCRFLXADS0 | CAPE CORAL | 2 | 3 |
| Southern | CAPE CORAL | CPCRFLXADS0 | CAPE CORAL | 2 | 1 |

FIG. 15

```
CODAKS              LOAD BALANCE REMARKS TABLE                    SF10952
10/14/2003                    MAINTENANCE                        10:26:35

┌1606  ┌1608               ┌1610
HOST CLLI: ADGNVAANRL0  SM: 1  LU: 1  START DATE: 10142003 (mmddyyyy)
        └1604
        1612
REMARKS:
    TEST
    TEST
    TEST COMPLETE DATE: 10182003 (mmddyyyy)
               └1614

CMD1-EXIT           CMD4-CANCEL
```

| CODARS | | | LOAD BALANCE REMARKS TABLE | | | | SF2003S01 |
| 10/14/2003 | | | INQUIRY | | | | 10:27:52 |

POSITION TO CLLI: _____ SN: _____ LU: _____ START DATE: _____

|  1704 1706 | 1708 1710 | | COMPLETE 1712 ACTIVITY | | 1716 1714 ACTIVITY |  |
| CLLI | SN | LU | DATE | DATE | DATE | TIME |
| --- | --- | --- | --- | --- | --- | --- |
| ABGNVAANRL0 | 1 | 1 | 10/13/2003 | 10/18/2003 | 10/13/2003 | 08:53:10 |
| ADNGVAU03O1 | 1 | 1 | 09/10/2003 | 09/12/2003 | 09/12/2003 | 00:42:45 |
| ABNGVAU03O1 | 2 | 2 | 09/10/2003 | | 09/11/2003 | 10:52:03 |
| ABNGVAU03O1 | 4 | 4 | 09/10/2003 | | 09/11/2003 | 10:51:37 |
| ABNGVAU03O1 | 5 | 5 | 09/10/2003 | | 09/11/2003 | 10:51:30 |
| ABNGVAU03O1 | 7 | 7 | 09/10/2003 | | 09/11/2003 | 08:43:20 |
| ABNGVAU03O1 | 9 | 9 | 09/11/2003 | | 09/11/2003 | 10:52:40 |
| ABNGVAU03O1 | 10 | 10 | 09/11/2003 | | 09/11/2003 | 11:33:26 |
| ABNGVAU03O1 | | | | 09/12/2003 | 09/11/2003 | 14:56:37 |
| NNPKFLEVH01 | 1 | 1 | 09/12/2003 | | 09/12/2003 | 08:54:20 |

Bottom

Position Cursor to select and enter to see details

CMD1=Exit    CMD5=Refresh

```
CDUARS                  LOAD BALANCE REMARKS TABLE                    SF2015I
10/14/2003                        INQUIRY                           10:31:10

HOST CLLI: ADGHVAAHRLO  SM:    ;  LU:   1   START DATE: 10132003 (mmddyyyy)
         ⌒             ⌒                                  ⌒
        1804          1806                               1810
                                  ⌒
                                 1808
─────────────────────────────────────────────────────────────────────────────
REMARKS:
  ⌒
 1812
      TEST ONLY COMPLETE DATE: 10/18/2003
   ⌒
  1814  ⌒
       1816
ACTIVITY DATE: 10/13/2003
ACTIVITY TIME: 08:53:40
USER ID.....: PS10308
              ⌒
             1818
              ⌒
             1820

CMD: -EXIT
```

COMPUTERIZED SYSTEM AND METHOD FOR DISPLAYING LINE USAGE REPORTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to the field of computer software. More particularly, the invention relates to a computerized tool and method for universal line management.

BACKGROUND OF THE INVENTION

Telecommunication networks start at the local level with a telephone or communication line that runs from a home or business. An exemplary telephone telecommunications system is shown in FIG. 1. Telephone lines are grouped to make a line unit 106. There are multiple line units 106 for each switch module 104. The switch modules 104 make a switching system 103 for a central office 102. A telephone call is transferred from the telecommunications line to a switch module 104 of central office 102 and is directed to the proper destination. There may be multiple central offices 102 in one region of a telecommunications network. Furthermore, there may be multiple regions in a national telecommunications network.

Due to increased telephone and Internet dial-up usage, the number of calls on certain equipment has greatly increased lines to become overloaded and this results in failed call attempts. As a result, certain line units may be plagued with chronic call failure and poor service quality. However, it is difficult to determine which line units are overloaded and need additional equipment to handle the call volume.

One method of determining whether equipment limitations have been exceeded is to manually search line units one at a time determine if the equipment in place is adequate for the call volume. This method is time consuming, expensive and requires a large amount of personnel. Furthermore, by the time the process is completed, traffic volumes may have changed and the information gathered is outdated.

Another method used to try to solve this problem is a "HOT SPOT" report sold by Lucent Technologies, Inc. The "HOT SPOT" report is a print out and snapshot view of the performance of line units for a particular switch module at the time the report is run. The drawback of the report is that it does not include line usage information for more than one point in time. Rather, the report receives information regarding line usage information only at one point and time, does not provide detailed information and does not give a picture of what the traffic volume is like at different times of day or even different seasons. The report does not allow for the results to be updated at any reasonable frequency. These reports provided limited line usage information and do not provide any line usage information about an overall region or on a national level for use by managers. Furthermore, these types of reports are limited and options are not available. It is not possible for a user to specify the type of report they would like to view.

New equipment is added to a telecommunications network it is not reflected in these "HOT SPOT" reports because the structure or layout of the network is only updated on a yearly basis. Thus, the reports do not reflect newly added or removed equipment.

A system and method for continuously collecting and monitoring line usage information and generating line usage reports based on the line usage information would be advantageous. A system and method for documenting newly added or removed equipment in a telecommunications that is updated on a regular basis would also be advantageous. Furthermore, allowing a user or other system to select a report type and report criteria to generate a line usage report would also be advantageous.

SUMMARY OF THE INVENTION

The present invention generally relates to the field of computer software.

In another embodiment of the present invention, a user interface for communicating line usage information is described. The user interface includes means for requesting type of report of line usage information and means for requesting report criteria. The user interface further includes means for displaying a line usage report based on the report criteria and requested type of report.

In one embodiment of the present invention, a method for communicating line usage information to a user is described. The method: prompts a user to enter a type of report of line usage information and to enter report criteria. The method then displays a corresponding line usage report.

In yet another embodiment of the present invention, a system for communicating line usage reports to a user is described. The system includes an obtaining component for obtaining report criteria and one or more types of line usage reports to be displayed and a report display component for displaying one or more line usage reports based on the report criteria and requested type of report.

BRIEF DESCRIPTION OF THE SEVERAL VIEWS OF THE DRAWINGS

The present invention is described in detail below with reference to the attached drawing figures, wherein:

FIG. 5 is a block diagram of an exemplary universal line usage information details tool;

FIG. 6 is a flow diagram of a method for displaying line unit performance details in accordance with an embodiment of the present invention;

FIG. 7 is a block diagram of an exemplary line load balance maintenance entry tool;

FIG. 10 is a screen shot illustrating exemplary display of report criteria;

FIG. 11 is a screen shot illustrating an exemplary line unit performance report;

FIG. 15 is a screen shot illustrating an exemplary consecutive week blockage report;

FIG. 16 is a screen shot illustrating an exemplary load balance remark table for maintenance information; and FIGS. 17-18 are screen shots illustrating exemplary load balance inquiry displays.

DETAILED DESCRIPTION OF THE INVENTION

The present invention relates to a computerized tool and method for universal line management. In one embodiment of the present invention a universal line usage information collection tool is described. Line usage information is collected to monitor and manage the performance of line units of switch modules. In another embodiment, a universal line usage-reporting tool or system is described.

The present invention also relates to a system and method for displaying detailed line usage information. In another embodiment of the present invention, a system and method for updating equipment in a telecommunications network is provided. Another embodiment of the present invention relates to a user interface. In still another embodiment, a system and method for updating the structure of a telecommunications system is described.

Various telecom technical terms are used throughout this disclosure. A definition of such terms may be found in: H. Newton, *Newton's Telecom Dictionary*, 18$^{th}$ Updated and Expanded Edition (2002). These definitions are intended to provide clearer understanding of the ideas disclosed herein and are in no way intended to limit the scope of the present invention. The definitions and terms should be interpreted broadly and liberally to the extent allowed by the art and the meaning of the words offered in the above-cited reference.

Figure 1:
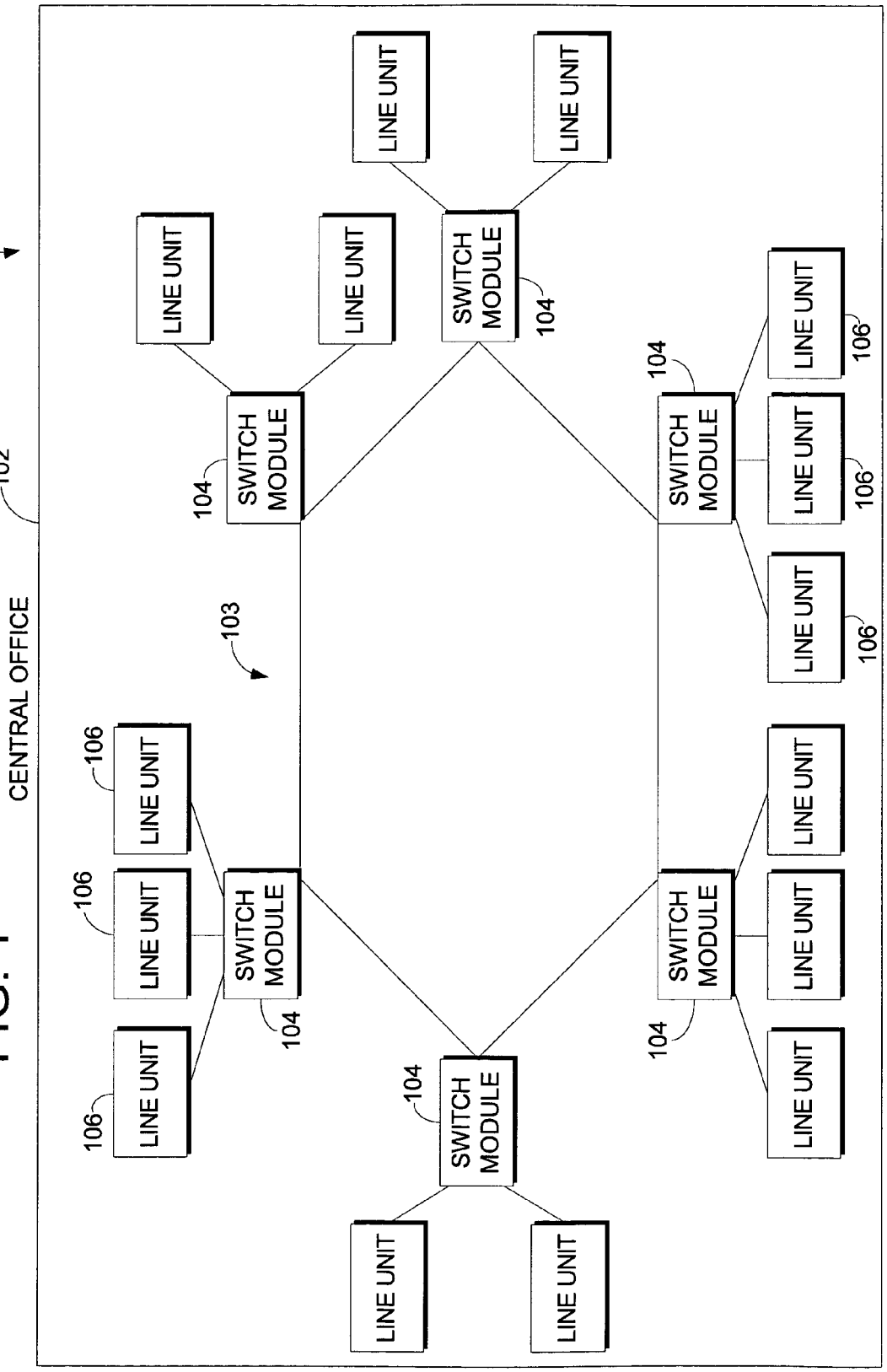
FIG. 1 is a block diagram of an exemplary telephone switching system.

With reference to FIG. 1, an exemplary telecommunications network 100 is provided. A telecommunications network is an assembly of equipment arranged to establish connection between communication lines. A switching system 103 is provided for central office 102. As can be seen in FIG. 1 multiple switch modules 104 make up the switching system 103. Furthermore, there are multiple line units 106 for each switch module 104. A telephone call is transferred via a telecommunications line to a switch module 104 of central office 102 and is directed to the proper destination.

One of skill in the art will appreciate that that any type or number of switch modules or switches may be used for telecommunications network of the present invention. One of skill in the art will also appreciate that there are any variety of ways to set up a telecommunications network. Examples of switch modules that may be used include, but are not limited to, 5-ESS switch modules by Lucent Technologies and Media Gateway 9000 (MG9K) system by Nortel. The tool and method of the present invention is capable of being used with any switch module, switch type, circuit switches, interface components and equipment used in a telecommunications network.

Figure 2A:
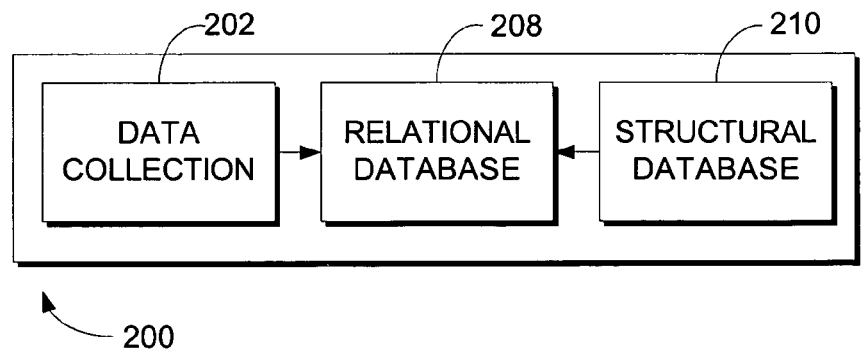
FIG. 2A is a block diagram of a universal line usage information collection tool in accordance with an embodiment of the present invention.

System and Method for Collecting and Storing Universal Line Usage Information With reference to FIG. 2A, in the first embodiment of the present invention a universal line usage information collection tool 200 is shown. The universal line usage information collection tool includes a data collection component 202, a relational database component 208 and a structural database component 210. The data collection component 202 receives line usage information from a telecommunications network. The line usage information may include, but is not limited to, usage information regarding equipment in a switching system, such as line units and switch modules.

Types of line usage information include, the percent overflow, usage information, current utilization percentage, network element, traffic element, hour the highest blockage occurred, the number of calls per piece of equipment, overflow information, number of working lines, equipped lines, wired lines and any information regarding the time, use or amount one or more items of equipment in telecommunications network are utilized. The data collection component 202 is capable of receiving line usage information for equipment in a national telecommunications network or at a regional or local level.

The data collection component 202 accesses information from the hardware/equipment in a telecommunications network and converts it to a readable form to be recorded. On example of a data collection component 202 is a centralized data collection (CDC). The CDC collects line usage information for equipment in a telecommunications network. The line usage information collected by the CDC is text associated with Common Language Location Identifiers (CLLI). CLLIs identify the location where the line usage information has originated.

The structural database component 210 contains information regarding the current telecommunications structure. For example, the structural database component 210 tracks the number of lines per line unit, the line units per switch module and what phone numbers have been assigned to what customers. The structural database component 210 contains the layout of equipment in a telecommunications network.

An example of the structural database component 210 is CODARS. CODARS tracks and provides telephone numbers for assignment to customers. CODARS also tracks custom calling features and message line information. CODARS also contains information regarding the layout and assignment of working lines, line units, telephone numbers and information regarding what lines and line units are connected to switch modules.

The relational database component 208 accesses structural information regarding the structure of equipment in the telecommunications network, such as the layout of switch modules and line units, from structural database component 210. The relational database component 208 reads the information collected by the data collection component 202 for line usage information that corresponds to certain equipment in the telecommunications network. For example, the structural database component 202 provides information to the relational database component 208 of the layout of the telecommunications network of state, region, host CLLI, line group and equipped/wired/working lines for the line group.

The relational database component uses the appropriate CLLI code information and corresponding line usage information from the data collection component to fill in the line usage information for the corresponding piece of equipment accessed from the structural database database component. In other words, the relational database component 208 organizes the line usage information according to the layout of the equipment accessed from the structural database component 210 and in a format that the information may be used to generate line usage reports. An exemplary relational database 208 is shown in Table 1 below. The table shows the information collected by the database component 210 organized based on the structural information from the structural database component 210.

TABLE 1

| CDST | 2 | TEXT('STATE') |
|------|---|---------------|
| CDWRC | 4 | TEXT('WIRE CENTER') |
| CDOFFC | 5 | TEXT('OFFICE') |
| CDLGRP | 20 | TEXT('LINE GROUP') |
| CDRCLI | 11 | TEXT('REMOTE CLLI CODE') |
| CDRPDT | 8 | TEXT('REPORT DAILY DATE - YYYYMMDD') |
| CDROFN | 20 | TEXT('REMOTE OFFICE NAME') |
| CDREGN | 4 | TEXT('REGION') |
| CDCOMP | 2 | TEXT('COMPANY CODE') |
| CDHCLI | 11 | TEXT('HOST CLLI CODE') |
| CDTUED | 8 | TEXT('TUESDAY DATE') |
| CDSM | 2 | TEXT('SWITCH MODULE') |
| CDLU | 2 | TEXT('LINE UNIT') |
| CDNWRK | 10 | TEXT('NETWORK ELEMENT TYPE') |
| CDOFTY | 1 | TEXT('OFFICE TYPE') |
| CDHOUR | 2 0 | TEXT('HOUR - HIGHEST BLOCKAGE') |
| CDPCOF | 11 8 | TEXT('PERCENT OVERFLOW') |
| CDUSGE | 5 0 | TEXT('USAGE') |
| CDPCCP | 11 8 | TEXT('PERCENT CAPACITY') |
| CDPEG | 3 0 | TEXT('PEG') |
| CDOVFL | 3 0 | TEXT('OVERFLOW') |
| CDTPEG | 4 0 | TEXT('TOTAL PEG') |
| CDHOLD | 6 0 | TEXT('HOLDING TIME') |
| CDEQPD | 6 0 | TEXT('EQUIPPED LINES') |
| CDWIRE | 6 0 | TEXT('WIRED LINES') |
| CDWKGQ | 6 0 | TEXT('WORKING LINES') |

An example of a relational database component 208 is iSeries DB2 database. The iSeries DB2 database is part of the iSeries platform (AS400). The relational database component 208 is accessed by the report generator component 207 described below in FIG. 2B to generate line usage reports discussed below.

In one embodiment of the invention, the relational database component automatically accesses the structural database component 210 to get the most current layout of equipment in the telecommunications network and reads the corresponding line usage information from the data collection component 202 at regular intervals. For example, the relational database component 208 may be programmed to read the data collection component 202 and the structural database component 210 on a weekly basis.

Those skilled in the art will appreciate that this embodiment of the present invention contemplates the presence of additional components and/or sub-components of the computer system, and the components and/or subcomponents may be combined with one another and/or separated into new components and sub-components. Those skilled in the art will also appreciate that the information stored in databases or tables as described in this application may be stored in an individual database or table or may be stored in multiple databases or tables.

Figure 3A:
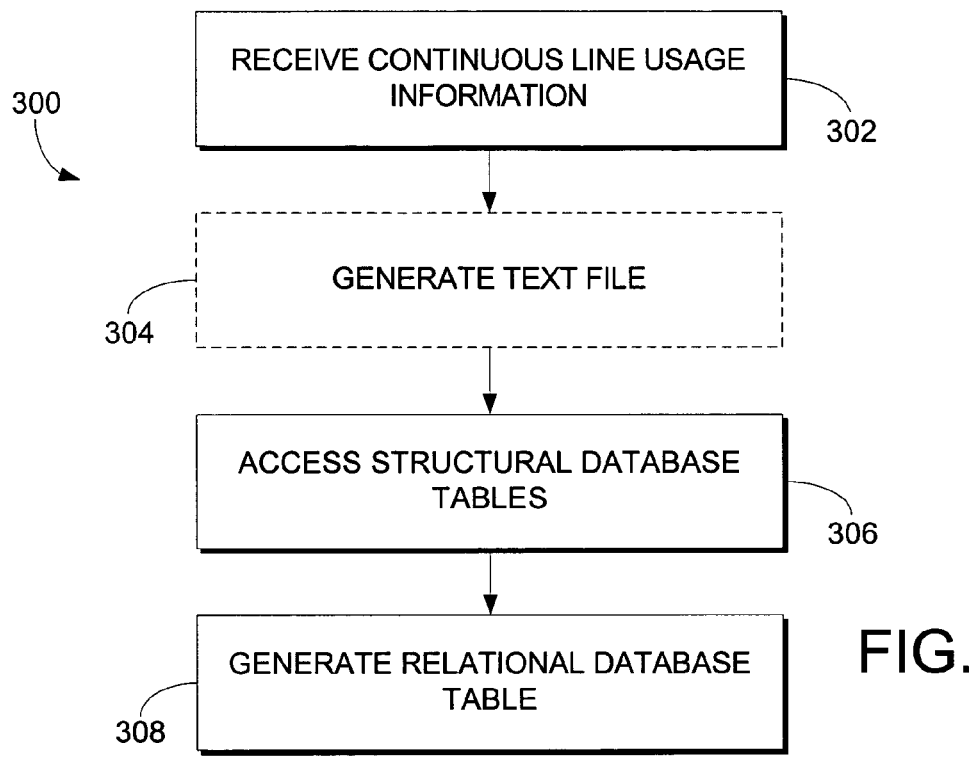
FIG. 3A is a flow diagram of a method for collecting and storing line usage information in accordance with an embodiment of the present invention.

Turning to FIG. 3A, a method for generating a relational database 300 is shown. At block 302 the system receives continuous line usage information from equipment in a telecommunications network. At block 304 the system generates a text file containing the line usage information received at block 302. In an alternative embodiment, the line usage information is received as a text file and block 304 is bypassed.

At block 306 the system accesses structural database tables containing information regarding the structure of the telecommunications network. At block 308 the system generates a relational database table by reading the text file for line usage information and organizing the information based on the structural information obtained from the structural database. The relational database is in a formatted form such that line usage reports may be easily generated.

System and Method for Generating Line Usage Reports

Figure 2B:
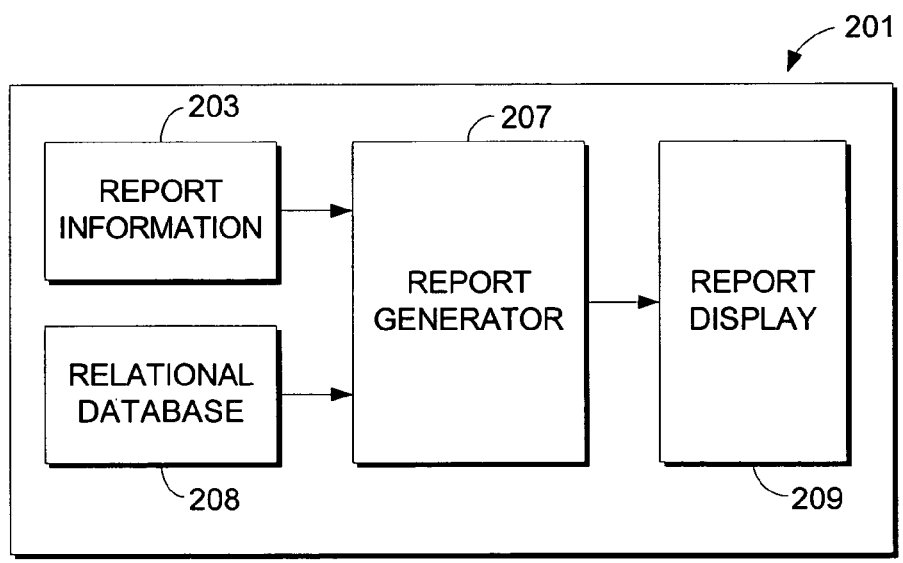
FIG. 2B is a block diagram of a universal line usage information reporting tool in accordance with an embodiment of the present invention.

With reference to FIG. 2B a universal line usage-reporting tool 201 is shown. The reporting tool 201 is web-based and is accessible to multiple users. The reporting tool 201 includes a report information component 203, a relational database component 208, a report generator component 207 and a report display component 209. The report information component 203 contains the criteria and type of report information used to generate the report component 207. In one embodiment, a user selects the criteria and report type. In another embodiment, the report component 207 is programmed to automatically generate a specific type report at a specified time based on pre-specified criteria. The report criteria include the region, company, state, office/host, switch module, line unit and time interval of usage information that a report is generated for.

The relational database component 208 contains stored line usage information organized based on the structure of the telecommunications network and is stored in a format that is accessible by the report generator component 207. The report generator component 207 extracts line usage information from the relational database component 208 based on the report information of report information component 203.

The report display component 209 displays the report generated by the report generator component 207. One of skill in the art will appreciate that the report display component 209 may display the line usage reports generated by the report generator component 207 in any variety of ways.

Figure 11:
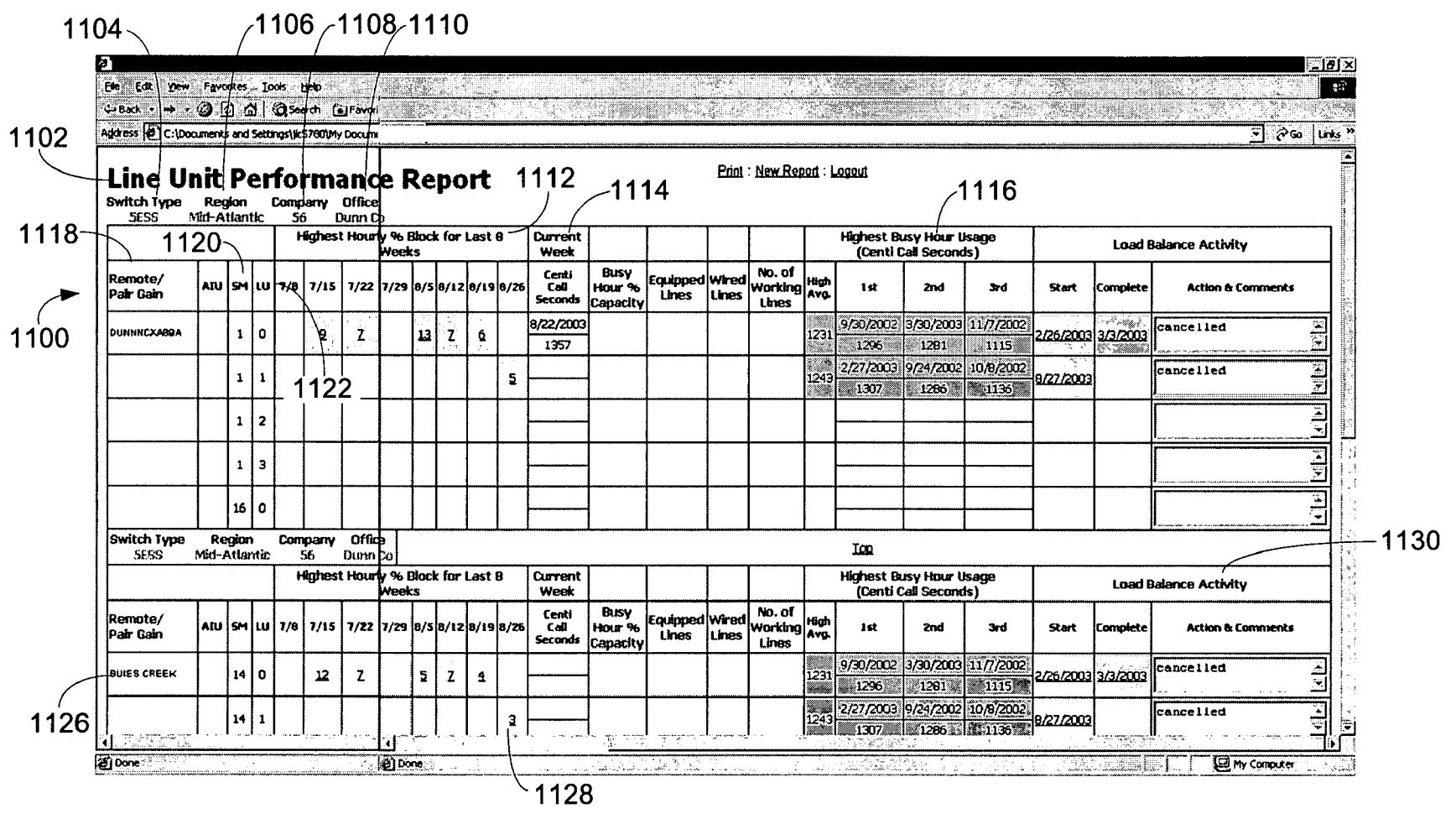

The types of reports generated by the report generator component 207 include line unit performance reports, blockage reports and consecutive reports. An exemplary line unit performance report is shown in FIG. 11 and breaks down lien usage information by switch modules and line units for different central offices. The line unit performance report includes information such as the switch type, the region, the central office, switch module information, line unit information, and for each line unit: the highest hourly percent block for the last eight weeks, busy hour percent capacity, equipped lines, wired lines, number of working lines, the highest busy hour usage, the busiest usage values, and any load balance activity that may have occurred or may be pending.

An exemplary line unit performance report 1100 is shown in FIG. 11. The exemplary line unit performance report 1102 is for a switch type 1104, region 1106, company 1108, and office 1110. In this example, the line unit performance report is for the 5ESS switch type, mid-Atlantic region, 56 Company, and the Dunne County Office.

In the exemplary line unit performance report of FIG. 11, the line usage information is divided out and displayed according to the remote/pair gain, switch module 1120, and line unit 1122. The line unit performance includes information including the highest hourly percent block for the last eight weeks 1112, for the current week 1114 and the highest busy hour usage 1116. Thus, for the remote/pair gain DUNNNCXA89A for switch module "1" and line unit "0", the highest percent blockage for the last eight weeks occurred on August 5th when the line units were 13% blocked. For the remote/pair gain Buies Creek 1126 the highest hourly percentage blockage for the last eight weeks for switch module "14" on line unit "1" was on August 26th when the lines were 3% blocked (1128).

Figure 14:
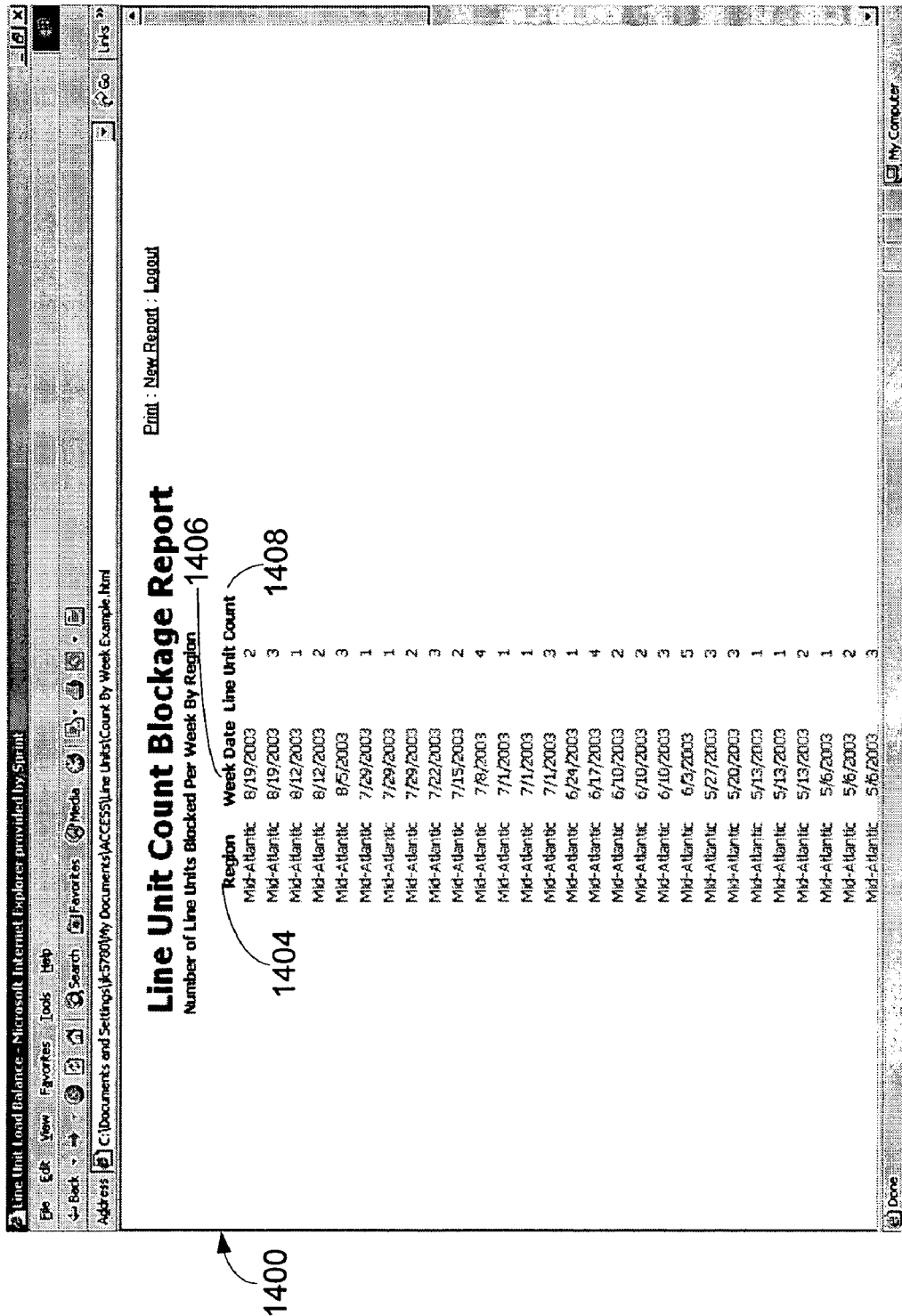
FIG. 14 is a screen shot illustrating an exemplary line unit count blockage report.

An exemplary blockage report or count by week is shown in FIG. 14 and lists the number of line units in a telecommunications network blocked per week by region. This report allows a user to see what regions may have the highest line unit blockage and the number of line units that may require additional equipment in order to perform properly.

The exemplary line unit count blockage report 1400 is also a "management report" and indicates failures/blockages. For example, one version of the line unit count block report specifies the number of line units blocked per week by region. The system lists the region 1404, week date 1406 and number of line units blocked for that week 1408. The exemplary management report displays that the Mid-Atlantic Region had three line units blocked the week of Aug. 5, 2003. This report is easily generated by obtaining the failure/blockage information from the relational database component 203 of FIG. 2B and displaying it in a management report so a manager can easily determine how many line units in each region are blocked and where attention needs to be focused.

An exemplary consecutive week report 1500 is shown in FIG. 15. The exemplary consecutive week report 150 shows the region, host, host description, switch, switch module and line unit that has had blockage reported within a set period of time.

The consecutive week blockage report 1500 displays line units with three consecutive weeks of blockage. However, one of skill in the art will realize that a blockage report may specify blockage for any amount of time. The blockage report 1500 lists the region 1504, switch 1506, host 1508, host description 1510, switch module 1512 and line 1514 unit exhibiting blockage for three consecutive weeks. This report allows a user to determine if the same equipment has chronic problems or if different equipment is failing each week. As shown in the exemplary blockage report 1500, there are numerous pieces of equipment that are exhibiting chronic problems every week. A user or manager can quickly identify what pieces of equipment need attention.

Those skilled in the art will appreciate that this embodiment of the present invention contemplates the presence of additional components and/or sub-components of the computer system, and the components and/or subcomponents may be combined with one another and/or separated into new components and sub-components.

Figure 3B:
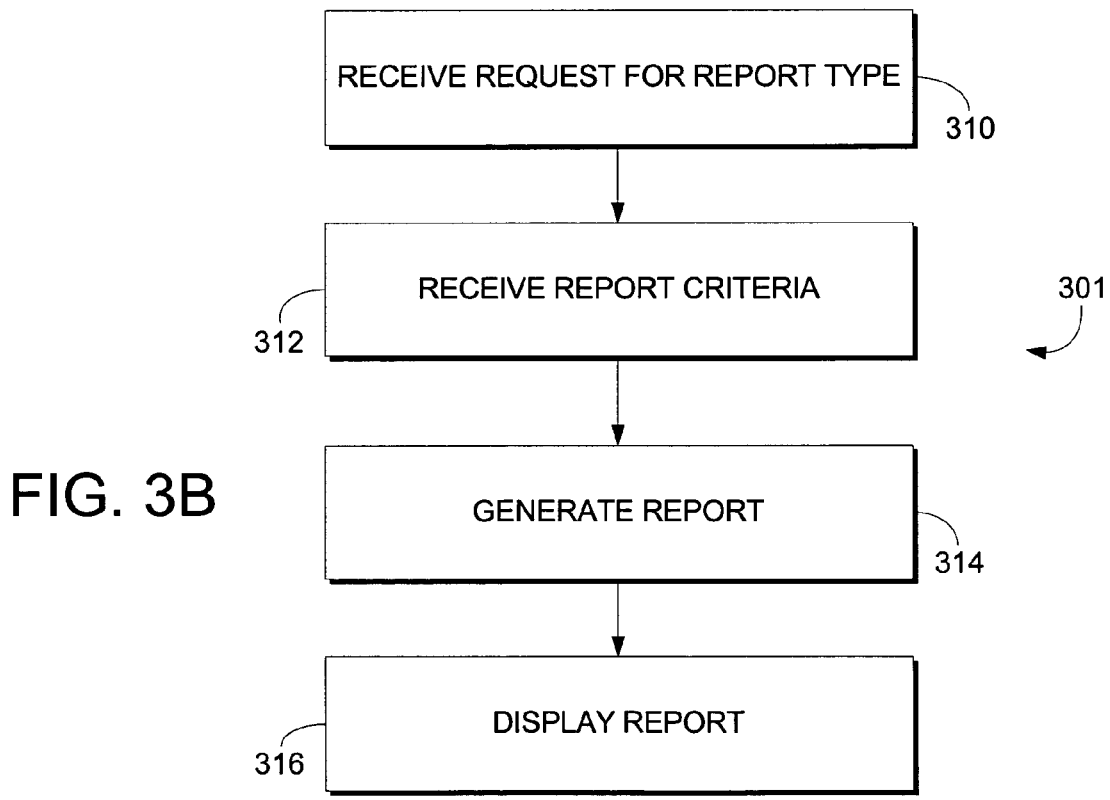
FIG. 3B is a flow diagram of generating reports of line usage information in accordance with an embodiment of the present invention.

Referring next to FIG. 3B, a method for generating a line usage report is shown. At block 310 the system receives a request for a report type. Report types include performance reports, account by week reports, and consecutive week reports and are described in more detail below with reference to FIG. 9. With reference again to FIG. 3B, at block 312 the system receives report criteria. The report criteria received can include the region, company, state, office/host, switch module, line unit and interval of usage information to generate a line usage report for. The report type and report criteria may be entered by a user or may be obtained from another database or table. At block 314 the system generates a report by searching the relational database table for line usage information that satisfies the report criteria received. The system then formats the report according to the requested report type. At block 316 the system displays the line usage report.

System and Method for Displaying Line Usage Reports

Figure 4:
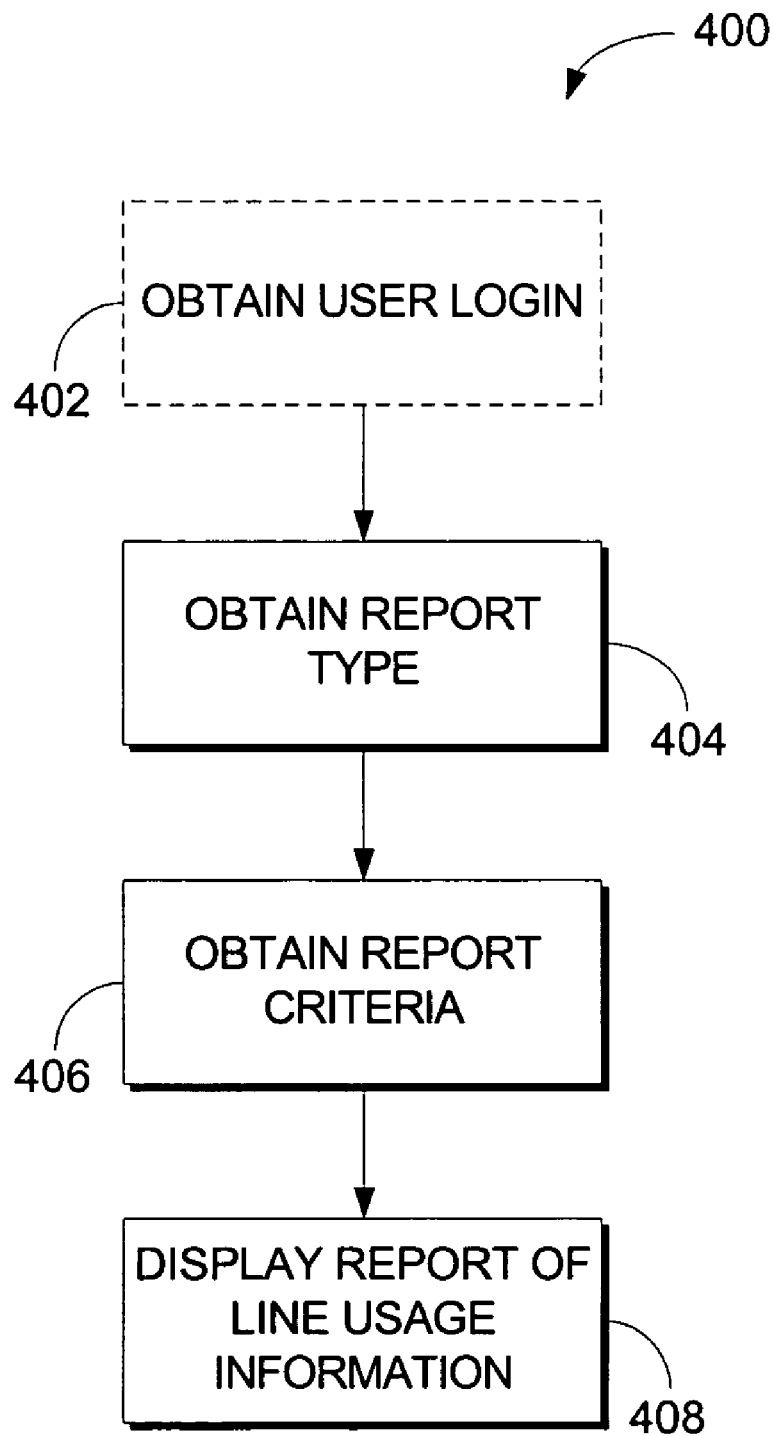
FIG. 4 is a flow diagram of a method for displaying reports of line usage information.

Referring next to FIG. 4, a user interface for displaying a report of line usage information 400 is provided. At block 402 the system obtains a user log-in name and password. At block 404 the system obtains the report type desired. At block 406, the system obtains the report criteria to be used to generate the report. At block 408, the system displays the report of line usage information based on the report criteria and report type received.

Figure 8:
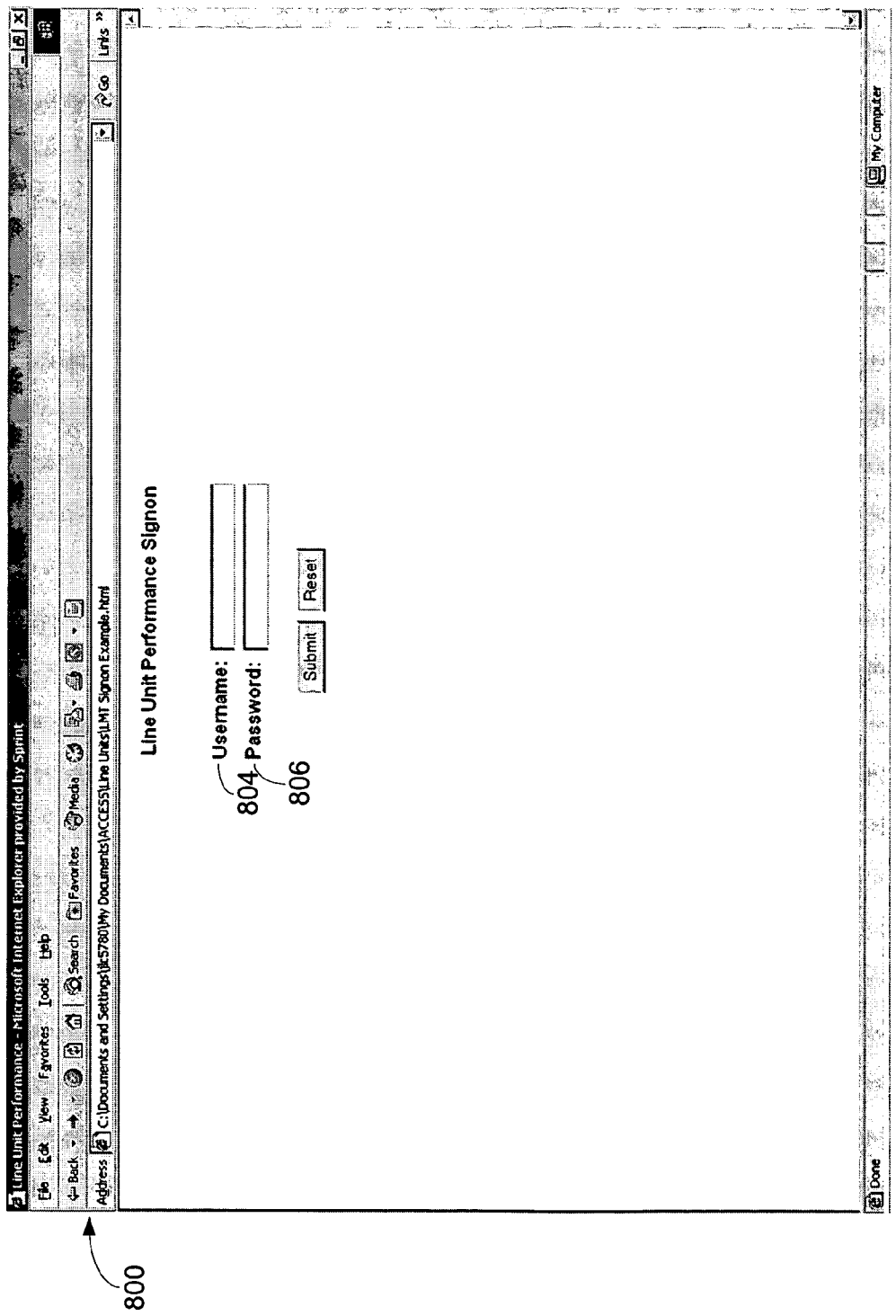
FIG. 8 is a screen shot illustrating an exemplary user log-in screen.

The following is an example of using method of displaying line usage reports and is illustrative rather than restrictive. At block 402, a user is prompted to enter a user login. An exemplary user login screen 800 is shown in FIG. 8. A user enters his/her user name 804 and their password 806. The user name and password are specific to users of the system and allow entry into the system. A user login screen 800 is optional for entry into the system.

Figure 9:
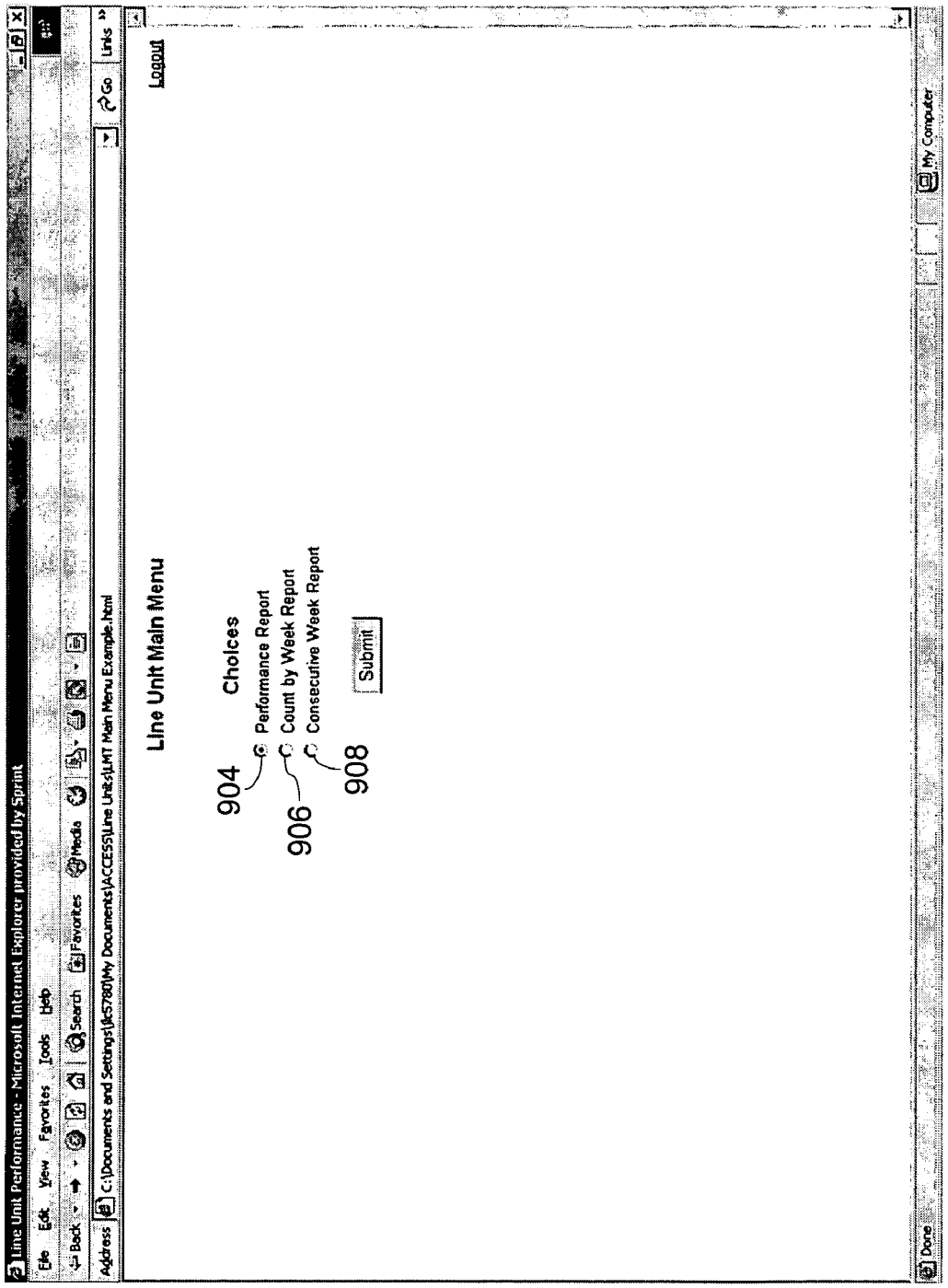
FIG. 9 is a screen shot illustrating an exemplary report type choice screen.

Referring again to FIG. 4, the system obtains the type of report they want to receive for line usage information at block 404. In one embodiment the system obtains the type of report from another system or database. In another embodiment, the system receives the type of report from a user. And in yet another embodiment, the system prompts the user for a report type by providing report type choices. With reference to FIG. 9, an exemplary screen of report-type choices 900 is shown. Examples of report choices include, but are not limited to, performance reports 904, blockage reports 906, and consecutive week reports 908.

Figure 10:
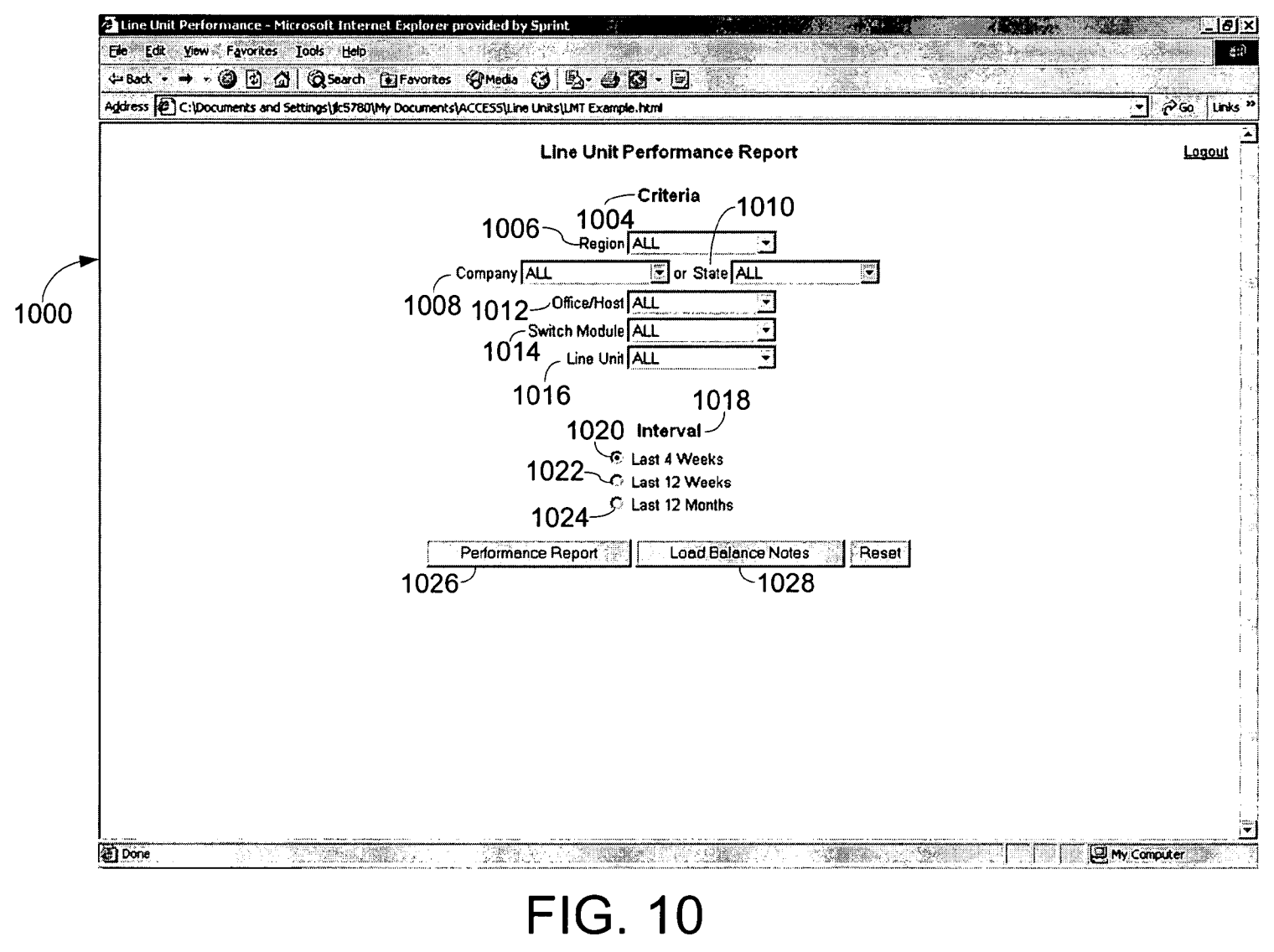

Referring again to FIG. 4, after the system obtains the report type they want at block 404, the system obtains the report criteria to be used to generate the line usage report at block 406. In one embodiment the system obtains the report criteria from another system or database. In another embodiment, the system receives the report criteria from a user. And in yet another embodiment, the system prompts the user for report criteria by providing criteria options. Referring now to FIG. 10, an exemplary screen displaying report criteria 1000 is shown. Criteria 1004 that may be used to generate a line usage report include the region 1006, company 1008, state 1010, office/host 1012, switch module 1014, and line unit 1016. Criteria that may be selected include the interval 1018 of line usage information the user wants displayed. For example, the user may choose to view line usage information for the last four weeks 1020, the last twelve weeks 1022, and the last twelve months 1024.

In this example, once the user has selected the criteria they would like used to generate the line usage report, the user selects button 1026. If the user wants to view or enter information regarding load balancing, the user selects the load balance notes button 1028. Selection of the load balance notes button 1028 will open load balance maintenance entry screen as shown in FIG. 16.

Once the user has entered the selected criteria for generating a line usage report and selects button 1026, the system displays the line unit performance report requested and according to the specified criteria at block 408 of FIG. 4.

The following is an example of a user interface for displaying a report of line usage information and is illustrative rather than restrictive. In this example, a user selects a line unit performance report type 904 from the report-type choice screen 900. The system then prompts the user to enter the criteria 1004 to be used to generate a line usage report. The user selects the Mid Atlantic region 1106 for company "56" 1008 and the Dunn County Office 1012. and selects an interval of eight weeks (not shown.)

Based on this report type selected and criteria entered, the system displays the Line Unit Performance Report 1100 shown in FIG. 11. The report is for the Mid Atlantic Region 1106, 56 Company 1108 and the Dunn County office 1100 showing results for the last eight weeks 1112.

System and Method for Displaying Line Usage Details and Load Balance Information Referring next to FIG. 5, a system for displaying line usage details and load balance information is shown. The system 500 includes a report display component 207, a load balance display component 504 and a line unit performance details component 506.

The report display component 207 displays line usage information in a line usage report for equipment in a telecommunications network. The line usage information includes the percent overflow, usage information, current utilization percentage, hour the highest blockage occurred, number of calls per piece of equipment, overflow information, number of working lines, and any other information that relates to the traffic or usage of equipment in a telecommunications network. Examples of report displays are shown below in FIGS. 11 and 14-15.

The load balance display component 504 displays information regarding activity and comments relating to balancing traffic on equipment in a telecommunications network. The load balance activity includes a start date and complete date for any activity to balance lines or equipment in a telecommunications network. The load balance activity may also include any actions taken and comments regarding the load balance. For example, action taken to balance the load of traffic in a telecommunication network may include adding or removing lines or switches to the telecommunications network. Load balance activity may also include information regarding planned activity to balance the traffic in a telecommunications network.

Load balance information displayed by the load balance display component may be edited or updated by a user. In one embodiment, the edits and/or updates are stored so that they can be displayed to users so that the users can view load balance activity being performed on equipment in the telecommunications network.

The line unit performance details component 506 provides details regarding line unit and equipment performance in a telecommunication network. The line unit performance details component allows a user to obtain additional information regarding line usage. The detailed information includes traffic for a piece of equipment for every hour of the day and the number and type of lines loaded on each unit (e.g. residential vs. business.) The detailed information may also include the number of lines that are 'wired' in existing line unit shelves, the number of lines that are 'equipped' with line cards in the selves, and the number of 'working' lines. The line unit performance detail component 506 provides detailed information for one or more pieces of equipment in a telecommunications network including the percent capacity, number of overflow calls or calls blocked per hour, the PEG count (e.g. the number of call attempts), CCS (e.g. centum call seconds or 100 call seconds) and average holding time per call in the hour. This allows a user to view detailed line usage information to help solve any traffic problem that may exist. The user may select a link to view the line usage details or the details may be provided together with the information displayed by the report display component 207.

Those skilled in the art will appreciate that the embodiment of the present invention contemplates the presence of additional components and/or sub-components of the computer system, and the components and/or subcomponents may be combined with one another and/or separated into new components and sub-components.

Referring next to FIG. 6, a method for displaying line unit performance details 600 is provided. At block 602, the system displays a generated line usage report. At block 604, the system displays any associated load balance information. At block 606, the system receives a request for line unit performance details. The request is be from a user selecting or "drilling down" on information in the line usage report. At block 608, the system returns and displays the line usage details requested. In one embodiment, the line unit performance details are obtained from the relational database component 208 of FIG. 2A.

The following is an example of a method for displaying line unit performance details and load balance activity and is illustrative rather than restrictive. With reference to FIG. 6, the line usage report is displayed at a block 602 and associated load balance information at block 604. With reference to FIG. 11, the line unit performance report 1102 includes a line usage report and load balance activity 1130. More detailed information regarding load balance can be obtained by selecting and/or "drilling down" the load balance notes button 1028 in FIG. 10 or by selecting load balance activity in performance report 1102 to obtain detailed load balance information.

Figure 12:
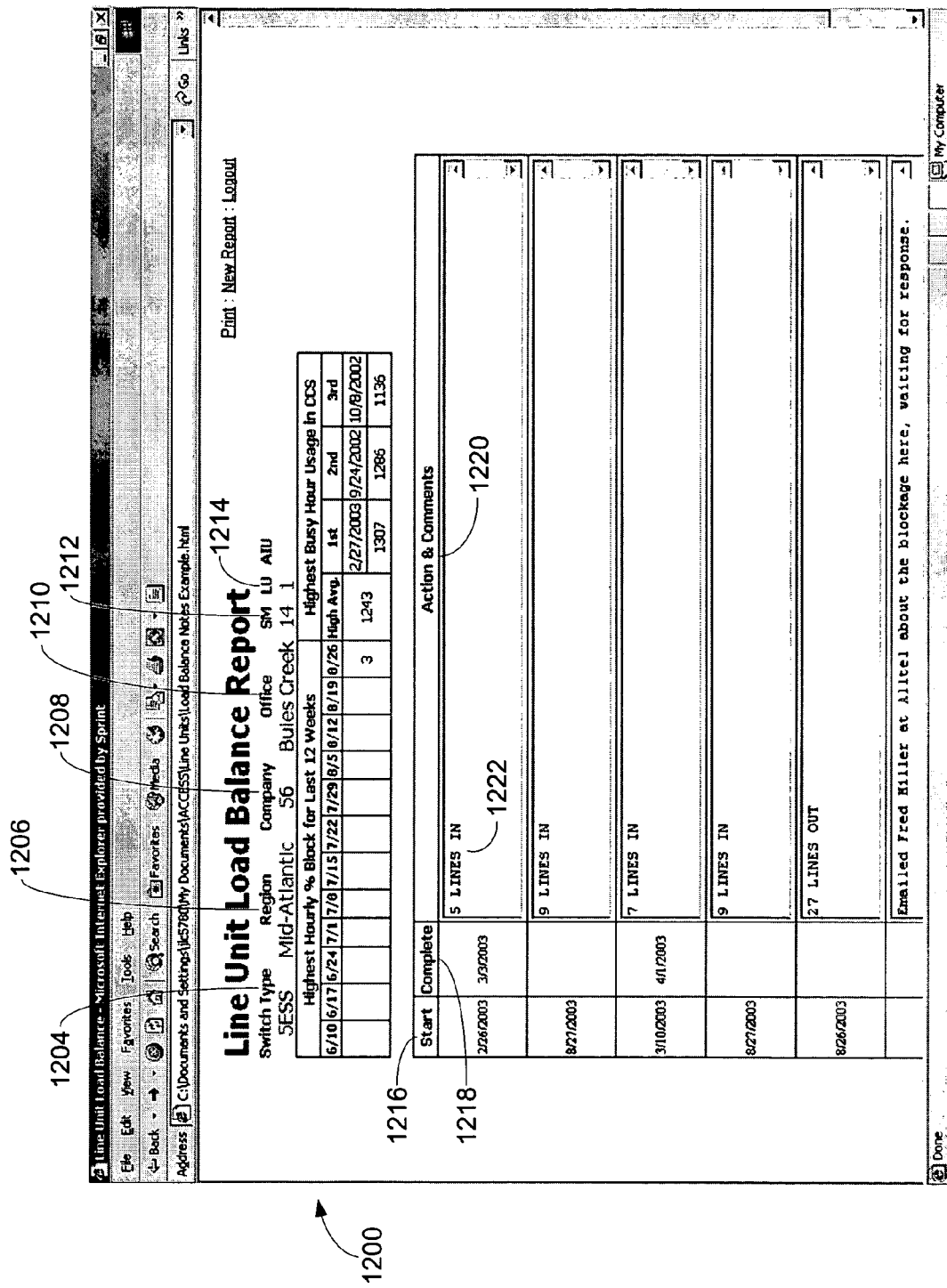
FIG. 12 is a screen shot illustrating an exemplary line unit load balance report.

FIG. 12 is an exemplary line unit load balance report 1200 displaying detailed load balance information. The load balance report 1200 includes load balance information for switch type 5ESS (1204), the mid-Atlantic Region (1206), the 56 Company (1208), the Buies Creek Office (1210) for switch module 14 (1212) and line unit 1 (1214). The load balance report includes a start date (1216) and completion date (1218) for any load balance activity or comments made regarding load balance activity (1220). In this instance, switch module "14" and line unit "1" had five lines added (1222) starting on Feb. 26, 2003 and this was completed on Mar. 3, 2003. The line unit load balance report 1200 allows the user to see a historical reference of all maintenance and equipment additions and removals done for a particular piece of equipment in a telecommunications network.

Referring again to FIG. 6, a user requests additional line unit performance details at block 606 and the system displays the details at block 608. In one embodiment, the user selects or "drills down" on a particular piece of equipment to see details regarding the line usage. For example, the user selects a particular interval for a line unit to see details regarding line usage on a line unit at a certain time of day. With reference to FIG. 11, a user selects the interval of August 26th (1128) for the Buies Creek Remote/Pair Gain switch module "14" and line unit "1". After receiving the request for line unit details for this particular interval, the system displays the line unit details for the selected interval at block 608 of FIG. 6.

Figure 13:
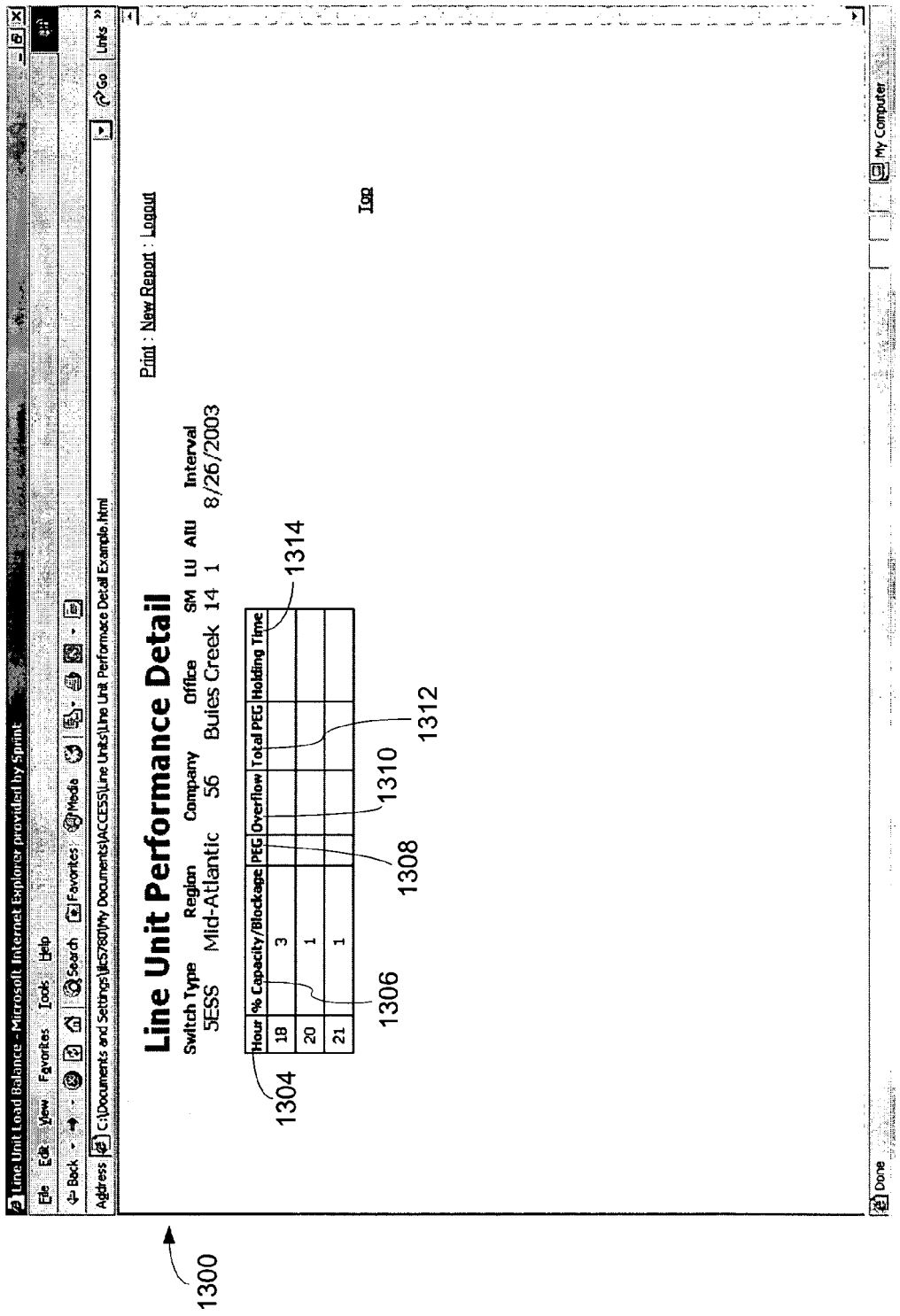
FIG. 13 is a screen shot illustrating an exemplary line unit performance details report.

An exemplary screen of line unit performance details for the selected interval is shown in FIG. 13. Details for the selected interval include the hour 1304, the percentage capacity/blockage 1306, the PEG 1308, the overflow 1310, the total PEG 1312, and holding time 1314. The highest percentage blockage on August 26th occurred during the eighteenth hour of the day. The user would be able to deduce from this information what equipment may be need to be added, moved or rearranged to solve the traffic problem.

System and Method for Updating the Structure of a Telecommunications System

Referring next to FIG. 7, a system for updating changes to the structure of a telecommunications system is shown. The system includes a maintenance entry component 702 and a structural database component 704. Information regarding load balance activity such as adding lines, removing lines, adding switch modules, removing switch modules, and adding or removing any other equipment in the telecommunications network, is entered into the maintenance entry component 702 by a user.

Once information regarding maintenance of equipment in a telecommunications system is entered into the maintenance entry component 702, this information is communicated to the structural database component 704. The information regarding the structure of the telecommunication network stored in the structural database component 704 is updated based on information received from the maintenance entry component 702.

In another embodiment, the addition and removal of equipment in a telecommunications system is driven by maintenance processes of the structural database component 704. In this embodiment, the structural database component automatically recognizes when equipment has been added or removed from a telecommunications network.

For example, new lines have been added to a particular line unit to help balance the traffic load, the structural database component 704 will be updated to reflect the new lines. The updated structural information is accessed on a regular basis when the relational database component 208 of FIG. 2A and when the relational database component 208 accesses the structural information in the structural database component and searches the data collection component 202 for line usage information for the equipment in the telecommunications network.

Those skilled in the art will appreciate that the embodiment of the present invention contemplates the presence of additional components and/or sub-components of the computer system, and the components and/or subcomponents may be combined with one another and/or separated into new components and sub-components.

With reference to FIG. 16, the following is an exemplary load balance maintenance entry screen 1600 and is illustrative rather than restrictive. The load balance remarks table 1602 includes a field for entry of the host CLLI 1604, switch module 1606, line unit 1608 and start date of maintenance 1610. The table 1602 also includes a remarks field 1712 and a field for entry of the completion date of maintenance 1614. The user enters the information in the host CLLI field 1604, switch module field 1606 and line unit field 1608 to identify the piece of equipment in the telecommunications network. For that piece of equipment, the user enters maintenance remarks. For example, the user enters that one or more lines or another piece of equipment are added or removed. The user also enters the completion date of the maintenance for the piece of equipment.

The information input into maintenance entry screen 1600 is then communicated to the structural database and the database is updated to reflect this information. The information entered into the maintenance entry screen 1600 may also be stored so that a user can obtain information regarding maintenance in the telecommunications network. For example, the structural database component may be set up to store and track maintenance information entered in addition to updating the structure of the telecommunications. In another embodiment, the maintenance information entered is stored in a separate database of table and is accessible to a user.

An example of maintenance information being accessible to a user a maintenance entry inquiry screen 1700 as shown in FIG. 17. The inquiry screen 1700 displays records in load balance remarks table. The maintenance information contained in these records has been entered by a user or received by another system. The records are listed by CLLI code 1704, switch module 1706, line unit 1708, start date 1710, completion date 1712, activity date 1716 and activity time 1714. A user can page up or down to scroll through the records. The records may be displayed in any order depending on specified parameters. For example, the records in the inquiry screen 1700 are organized according to the start date of maintenance. In this example, the record for the CLLI position ABGN-VAAMRLO for switch module "1" and line unit "1" has maintenance activity on Oct. 13, 2003 and the expected completion date is Oct. 18, 2003. If the user selects a maintenance inquiry record from the list, the user can view more information regarding the maintenance record.

For example, if the user selects the CLLI position ABGN-VAAMRLO for switch module "1" and line unit "1", a maintenance entry inquiry screen 1800 for an individual record is provided of FIG. 18. The exemplary record lists the Host CLLI 1814, switch module 1806, line unit 181 and start date 1810. The inquiry screen 1800 displays any remarks 1812 for the record, the completion date 1814, activity date 1816, activity time 1818 and user ID 1820. Thus, a user can view the completion date or expected completion date 1814 of the maintenance record, the date 1814 and time 1818 information was entered into the record and the identify of the user 1820 who entered the information into the maintenance record.

In summary, the present invention relates to numerous embodiments. The present invention relates to a computerized tool and method for universal line management. In one embodiment of the present invention a universal line usage information collection tool is described. In another embodiment, a universal line usage-reporting tool or system is described.

The present invention also relates to a system and method for displaying detailed line usage information. In another embodiment of the present invention, a system and method for updating equipment in a telecommunications network is provided. Another embodiment of the present invention relates to a user interface. In still another embodiment, a system and method for updating the structure of a telecommunications system is described.

Although the invention has been described with reference to the preferred embodiment illustrated in the attached drawing figures, it is noted that substitutions may be made and equivalents employed herein without departing form the scope of the invention as recited in the claims. For example, additional steps may be added and steps omitted without departing from the scope of the invention.

The invention claimed is:

1. A method in a computerized environment for communicating line unit usage information to a user, the method comprising:

prompting the user to enter a type of report of line unit usage information collected from at least one line unit, wherein each line unit is associated with a switch module and includes a grouping of a plurality of communication lines, and wherein a plurality of switch modules comprise a central office;

prompting the user to enter report criteria, wherein the report criteria comprises a user-specified time interval for which a line unit usage report is to be generated; and displaying a line unit usage report based on the report criteria and requested type of report, wherein data in the line usage report is derived from a relational database component, wherein the relational database component is configured to access a structural database component containing a current layout of the switch module and the at least one line unit associated with the switch module, and wherein the relational database is further configured to organize the data in the line usage report according to the current layout.

2. The method of claim 1, wherein the type of report is a line unit performance report.

3. The method of claim 2, wherein the line unit performance report displays line unit usage information by switch modules and line units for one or more central offices.

4. The method of claim 3, further comprising:
displaying load balance activity associated with equipment in the line unit performance report.

5. The method of claim 1, wherein the type of report is a blockage report.

6. The method of claim 5, wherein the blockage report displays the number of line units in a telecommunications network blocked per period of time per region.

7. The method of claim 1, wherein the type of report is a management report.

8. The method of claim 7, wherein the management report displays the number of line units blocked per a period of time per region.

9. The method of claim 1, wherein the method is computer-executable instructions for performing the method on one or more computer readable media.

10. The method of claim 1, wherein the criteria comprise one or more of geographic location, region, company, state, office, switch module, and line unit.

11. The method of claim 1, further comprising:
prompting the user to enter a user name and password.

12. A user interface for communicating line unit usage information, the interface comprising:
means for obtaining a type of report of line unit usage information collected from at least one line unit, wherein each line unit is associated with a switch module and includes a grouping of a plurality of communication lines, and wherein a plurality of switch modules comprise a central office;
means for obtaining report criteria, wherein the report criteria comprises a user-specified time interval for which a line unit usage report is to be generated; and
means for displaying a line unit usage report based on the report criteria and type of report obtained, wherein data in the line usage report is derived from a relational database component, wherein the relational database component is configured to access a structural database component containing a current layout of the switch module and the at least one line unit associated with the switch module, and wherein the relational database is further configured to organize the data in the line usage report according to the current layout.

13. The user interface of claim 12, wherein the type of report is a line unit performance report.

14. The user interface of claim 13, wherein the line unit performance report displays line usage information by switch modules and line units for one or more central offices.

15. The user interface of claim 14, further comprising:
means for displaying load balance activity associated with equipment in the line unit performance report.

16. The user interface of claim 12, wherein type of report is a blockage report that displays the number of line units in a telecommunications network blocked per period of time per region.

17. The user interface of claim 12, wherein the type of report is a management report that displays the number of line units blocked per a period of time per region.

18. The user interface of claim 12, wherein the criteria comprise one or more of a geographic location, region, company, state, office, switch module, and line.

19. A system for communicating line unit usage reports to a user, the system comprising:
an obtaining component for obtaining report criteria and one or more types of line unit usage reports including information collected from at least one line unit to be displayed, wherein each line unit is associated with a switch module and includes a grouping of a plurality of communication lines, and wherein a plurality of switch modules comprise a central office, and wherein the report criteria comprises a user-specified time interval for which a line unit usage report is to be generated; and
a report display component for displaying one or more line unit usage reports based on the report criteria and requested type of report, wherein data in the line usage report is derived from a relational database component, wherein the relational database component is configured to access a structural database component containing a current layout of the switch module and the at least one line unit associated with the switch module, and wherein the relational database is further configured to organize the data in the line usage report according to the current layout.

20. The system of claim 19, further comprising:
a load balance display component for displaying load balance activity associated with equipment in the line usage report.

21. The system of claim 19, wherein the obtaining component obtains the report criteria and one or more types of line usage reports to be displayed from another system.

22. The system of claim 19, wherein the obtaining component receives the report criteria and one or more types of line usage reports to be displayed from a user.

23. The system of claim 19, wherein the obtaining component prompts the user to enter report criteria and one or more types of line usage reports to be displayed.

* * * * *